(12) United States Patent  
Lewis (10) Patent No.: US 7,246,849 B2
(45) Date of Patent: Jul. 24, 2007

(54) VEHICLE SEAT WITH ARRANGEMENT FOR RESISTING LOADS APPLIED TO THE SEAT

(75) Inventor: Gordon Lewis, Smithfield (AU)

(73) Assignee: G & J Lewis Enterprises Pty Ltd, New South Wales (AU)

( * ) Notice: Subject to any disclaimer, the term of this patent is extended or adjusted under 35 U.S.C. 154(b) by 0 days.

(21) Appl. No.: 10/533,194

(22) PCT Filed: Oct. 31, 2003

(86) PCT No.: PCT/AU03/01440

§ 371 (c)(1),
(2), (4) Date: Oct. 28, 2005

(87) PCT Pub. No.: WO2004/039643

PCT Pub. Date: May 13, 2004

(65) Prior Publication Data

US 2006/0097559 A1    May 11, 2006

(30) Foreign Application Priority Data

Oct. 31, 2002   (AU) .............................. 2002952404
Sep. 3, 2003    (AU) .............................. 2003904806

(51) Int. Cl.
*B60R 21/00* (2006.01)

(52) U.S. Cl. ........................ 297/216.17; 297/344.12; 297/216.13

(58) Field of Classification Search ............... 297/353, 297/216.17, 219.19, 216.13, 344.12
See application file for complete search history.

(56) References Cited

U.S. PATENT DOCUMENTS

| | | | |
|---|---|---|---|
| 4,784,434 A * | 11/1988 | Iwami | 297/216.17 |
| 5,015,010 A | 5/1991 | Homeier et al. | |
| 5,642,916 A * | 7/1997 | Dybro et al. | 297/216.17 X |
| 6,109,691 A * | 8/2000 | Gray et al. | 297/216.17 |
| 6,267,440 B1 * | 7/2001 | Hoffman | 297/216.1 |
| 6,322,140 B1 | 11/2001 | Jessup et al. | |

FOREIGN PATENT DOCUMENTS

| | | |
|---|---|---|
| AU | 728411 B3 | 1/2001 |
| DE | 3813557 A1 | 11/1989 |
| DE | 3921 996 A1 | 1/1990 |
| DE | 3838656 A1 | 5/1990 |
| DE | 195 28 308 A1 | 2/1997 |
| EP | 0 553 062 A2 | 7/1993 |
| EP | 0 451 035 B1 | 11/1993 |
| WO | WO 2000/50259 A1 | 8/2000 |

* cited by examiner

*Primary Examiner*—Anthony D. Barfield
(74) *Attorney, Agent, or Firm*—The Webb Law Firm

(57) ABSTRACT

A vehicle seat including an arrangement for resisting loads applied to the vehicle seat which comprises a seat base and a seat back; said arrangement including a link mechanism connected between the seat back and a support member connected to the vehicle. The link mechanism is arranged to prevent motion of the seat back beyond a predetermined position. There is also provided an adjustable tether arrangement including a tether means, the tether means being arranged to be mounted between the seat back and a vehicle body and the tether means including a tether strap and a retractor mechanism enabling the tether strap to extend or retract in accordance with allowed motion of the vehicle seat.

6 Claims, 8 Drawing Sheets

VEHICLE SEAT WITH ARRANGEMENT FOR RESISTING LOADS APPLIED TO THE SEAT

FIELD OF THE INVENTION

The present invention relates to a vehicle seat which includes an arrangement for resisting loads applied to the vehicle seat, and, particularly, but not exclusively, relates to a vehicle seat including an integrated seat belt.

BACKGROUND OF THE INVENTION

It is well known in vehicles to have seat belts attached directly to the vehicle and not to the seat. This has some advantages, such as the vehicle provides a solid anchor for the seat belt and therefore good resistance to application of a load to the seat belt. There are some disadvantages, however. In order to allow for adjustable reclining of the seat, or a change in position of the seat relative to the vehicle a seat belt which is attached to the vehicle will need to be readily adjustable. Because the position of a seat belt is fixed relative to the vehicle, in some adjusted positions of the seat belt the seat may not be in the ideal position for the user. In general, integrated seat belts (where the seat belts are attached to the seat and not to the vehicle) are considered to be safer than seat belts that are anchored to the vehicle. Further, in some cases it is difficult to anchor a seat belt to a vehicle and the seat belt must be integrated with the seat. Examples of this include public transport eg. seats on buses that are not near the walls of the vehicles. In suspension seats, where the seat is suspended relative to the vehicle for comfort, an integrated seat belt is a safer and more convenient option. Suspension seats are often used in large vehicles such as trucks and military vehicles. Further, in some cases, legislation requires that seats must have integrated seat belts.

Where a seat is provided with an integrated seat belt, the seat must be arranged to cope with the very high loads that may be applied in the event of an accident. With lap-sash type or harness type seat belts, where the belt is anchored to an upper portion of the seat back, the seat must be especially strong to resist collapsing when load is applied by the sash or harness. It is in fact often the case that for some types of vehicles where particularly large loads may be applied, only lap belts are provided.

In order to deal with the high loads applied to some seats, it is known to utilise tether straps which attach the seat frame to the vehicle. In this way, at least some of the load applied by the integrated seatbelt can be transmitted via the seat frame to the vehicle. In the event of an accident, the tether strap prevents the seat from collapsing or moving under load. A problem with tether straps is that they are of a fixed length and require adjustment whenever the position of the seat is adjusted or the seat height is changed. If the tether strap is not readjusted correctly. This can be dangerous.

SUMMARY OF THE INVENTION

In accordance with a first aspect, the present invention provides a vehicle seat arrangement, comprising a seat frame, including a seat base and a seat back, and a support member being arranged to be mounted relative to a vehicle proximate the seat back, and a link means connected between the support member and the seat back, and being arranged to prevent motion of the seat back beyond a predetermined position.

The link means may be a mechanical link connected between the support member and the seat back. The link means is arranged to resist motion of the seat frame relative to the support member beyond a predetermined position. The link means is preferably strong enough to resist motion of the seat back relative to the support member under a load, such as a load that may be applied to the seat back during a vehicle accident.

The vehicle seat arrangement may include an integral seat belt. This may be a lap and sash arrangement or it may be a harness arrangement. The seat back may include a seat belt mounting for carrying a sash-type seat belt.

The support member may form part of a suspension arrangement and may comprise a frame member supporting a suspension arrangement for the seat frame.

The link means may form or form part of a recliner mechanism arranged to control the reclining of the seat back.

In a preferred embodiment, an advantage of having a strong link mounted between a support member (perhaps being part of a suspension arrangement) which is mounted relative to the vehicle, and the seat back obviates the requirement for any tether arrangement as long as the link and support member are strong enough to resist loads that may be applied. The link means is preferably positioned between the seat back and the support member to a position which is remote from a pivot connection between the seat back and seat base. The further away from the pivot connection that the link means is positioned and the closer to the seat belt mounting point on the seat back, the less strain will be applied to the link means when load is applied via the seat belt to the seat belt mounting. In one embodiment, the link means is positioned remote from the pivot connect between the seat back and seat base. In accordance with a second aspect, the present invention provides a vehicle seat arrangement, including a seat frame and a tether means, the tether means being arranged to be mounted between the seat frame and a vehicle body and the tether means including a tether strap and a retractor mechanism enabling the tether strap to extend or retract in accordance with allowed motion of the seat frame.

The allowed motion of the seat frame may be normal motion, such as adjustment of the seat position backwards or forwards with respect to the vehicle, or the normal up and down motion of a suspension seat. During unusual motion, however, such as may occur when a sudden load is applied to the seat during an accident, the tether strap does not extend or retract and operates to retain the seat frame with respect to the vehicle body, acting as an anchor. Preferably, the retractor mechanism includes an inertia reel mechanism, which is arranged to lock when motion of the seat frame exceeds a pre-determined inertial threshold. The advantages of having a tether strap which is able to extend and retract during normal motion include the ability to be able to adjust the position of the seat without having to adjust a fixed length tether strap, and also the ability to allow a free range of motion for any suspension system without having to worry about a fixed length tether strap.

In one embodiment, the tether means is height adjustable so that it may cope with corresponding adjustments in seat height whilst maintaining an optimum anchor point for the seat.

The seat arrangement preferably includes a suspension arrangement which allows the seat frame to move relative to the vehicle in accordance with the suspension. The seat frame is preferably supported by the suspension arrangement which includes a support member mounted relative to the vehicle. In one embodiment, the tether means is mounted at one end therefore to the support member. Where the tether means is mounted to the support member, preferably a link means is provided between the support member and the seat frame, the link means being arranged to resist motion of the seat frame relative to the support member. Preferably, the link means is arranged to extend to a pre-determined point, to allow some limited motion between the seat frame and the suspension system, but does not allow motion past the pre-determined point.

The seat frame preferably comprises a seat base and a seat back. The link is provided between the seat back and the support member. This facilitates mounting of an integrated lap-sash belt to the seat frame, the mounting point for the top part of the sash belt being high up on the seat back.

In a modification of this embodiment, the link means is replaced by a recliner mechanism. This obviates the need for a standard recliner mechanism at the intersection of the seat back and the seat base.

In accordance with a third aspect, the present invention provides a tether arrangement for anchoring a vehicle seat to a vehicle body, the tether arrangement being arranged to be mounted between the seat and vehicle body and including a tether strap and a retractor mechanism enabling the tether strap to extend or retract in accordance with allowed motion of the seat.

In one embodiment, the tether arrangement is height adjustable.

BRIEF DESCRIPTION OF THE DRAWINGS

Features and advantages of the present invention will become apparent from the following description of embodiments thereof, by way of example only, with reference to the accompanying drawings, in which.

DETAILED DESCRIPTION OF PREFERRED EMBODIMENTS

Referring to the drawings, a seat arrangement in accordance with an embodiment of the present invention, includes a seat frame 1, which in this embodiment includes a seat back 2 and seat base 3. The seat frame may be made from any appropriate material, such as metal, using known techniques. In the drawings the seat frame 1 is shown without any covering. It will be appreciated that in use the frame 1 will be covered by coverings and seat base 3 and seat back 2 cushions. The seat arrangement also includes a tether means, generally designated by reference numeral 4 and which includes a retractor mechanism 5 and a tether strap 6. In this embodiment the retractor mechanism 5 is an inertia reel mechanism including a reel on which the tether strap 6 winds and unwinds. The inertia reel mechanism may be of standard type and is not shown here in detail. In this embodiment the tether strap has one end attached to a mounting 7 on a support member 30 which is arranged to be amounted relative to a vehicle (now shown) in use. The retractor mechanism 5 is arranged to be mounted to a vehicle body, not shown in these drawings. For example, the retractor mechanism 5 could be mounted to the internal wall of the vehicle or a floor of the vehicle. Note that in an alternative embodiment, the retractor mechanism 5 could be mounted to the seat arrangement and the other end of the tether strap could be mounted to the vehicle, the effect being similar.

In operation, the seat arrangement would be mounted in the vehicle on, for example, rails on the vehicle floor. Rails 8 are shown in the drawings. These may be different from the rails which are mounted on a vehicle floor, but nevertheless are sufficient to illustrate. In this embodiment the rails mount a support member 30. In this arrangement the support member 30 is a frame member of the suspension arrangement (to be described later).

In use, the seat frame 1 may be adjusted in height or forwards or backwards and the inertia reel mechanism 5 enables the tether belt 6 to extend or retract to adjust to the new position of the seat without it being necessary to separately adjust the tether strap 6. During application of a high load to the seat frame 1, such as in an accident, the inertial threshold of the mechanism 5 is exceeded and tether strap 6 anchors the seat frame firmly relative to the vehicle.

In this embodiment, the seat arrangement includes a suspension arrangement 9. Suspension arrangment 9 is not shown in detail, but includes a housing 10 mounting a suspension system (not shown). Such suspension arrangements are known, however, and they include resilient means suspending the seat back 2 and seat base 3 for motion relative to the rest of the seat arrangement, for comfort of the user. One form of suspension arrangement is described in applicant's earlier Australian patent number 728411.

In this embodiment, the mounting 7 for the tether strap 6 is on a frame member of the suspension arrangement 9.

To constrain motion of the seat back 2 relative to the suspension arrangement 9, a linkage 11 is provided between the frame member 12 of the suspension arrangement and the seat back 2. In this embodiment, the linkage 11 comprises a "scissors" link comprising two members 13 and 14 hinged together at hinge 15. The hinge 15 includes a pin 31 rotably connecting reel members 13 and 14 and mounted in passageways 32 in link member 14 and corresponding passageway (not shown) in link member 13. A further pin 33 seated in passageway 34 in link member 13 mounts the link member 13 to the frame member 12. A further pin (not shown) mounts an end of the link member 14 to the seat back 2. The hinged arrangement of the link 11 enables normal motion of the seat back 2 and seat base 3 relative to the suspension arrangement 9 and also enables the seat back to be reclined using recliner mechanism 16A (which is a conventional recliner mechanism). Forward motion of the seat back 2 relative to the suspension arrangement 9 and therefore the tether strap 6 is constrained at the limit of the extension of the link 11, however. In the event of an accident, therefore, where a sudden load is applied to the seat back 2, the seat back will not extend past the extent of the linkage 11 relative to the suspension arrangement.

Note that other types of linkage than a scissor linkage may be used, eg. strong webbing.

The seat arrangement is provided with an integrated lap/sash seat belt system 16. The seat belt system includes a seat belt strap 17, and an inertia reel mechanism 18 mounted to the suspension system frame and a sash mounting 19. The sash mounting 19 is at the upper part of the seat back 2 and in the event of an accident a significant amount of leverage will therefore be applied to the seat back. The linkage 11 is therefore strong enough to prevent the seat back from breaking away from the seat suspension, even under the excessive leverage.

Figure 4:
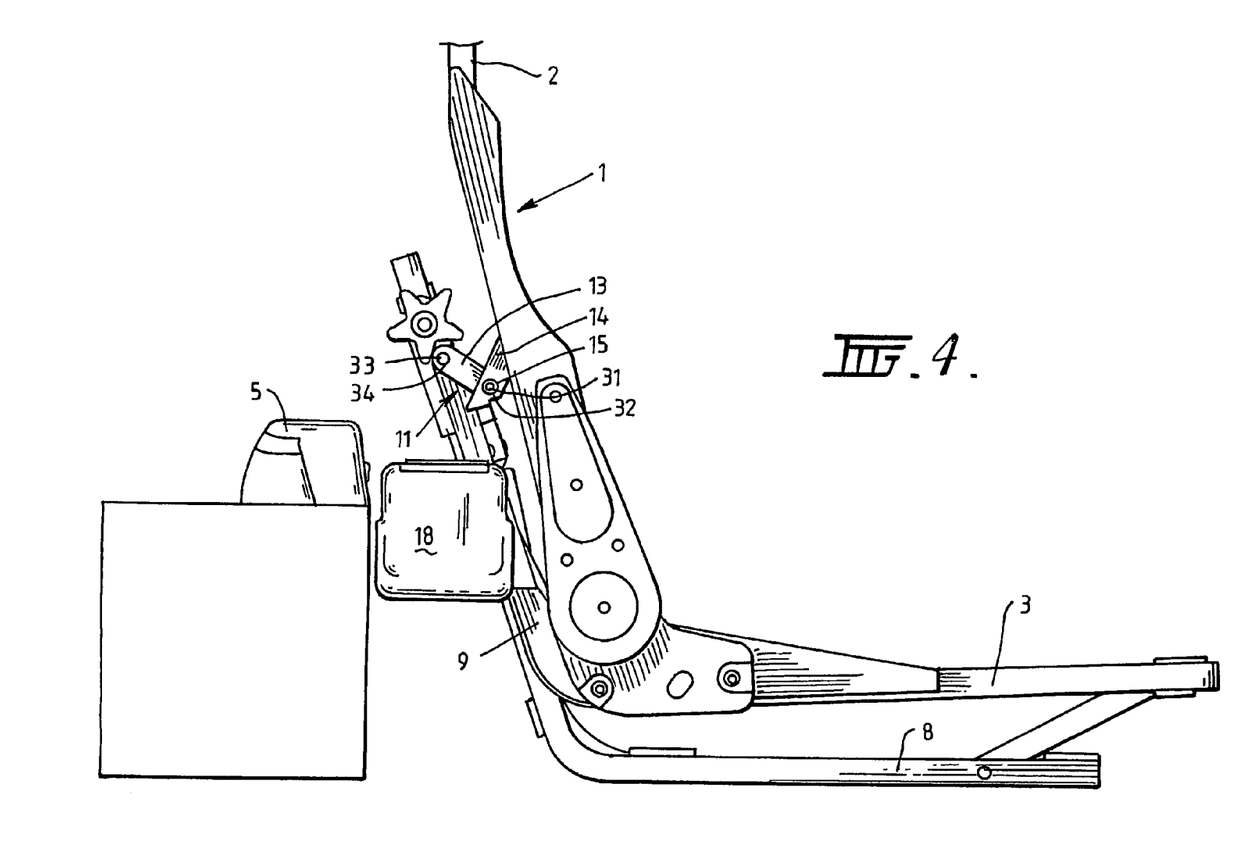
FIG. 4 is a further side view of the embodiment of FIG. 1.

Note that in FIG. 4, for clarity the cover strap and seat belt are not shown.

Figure 5:
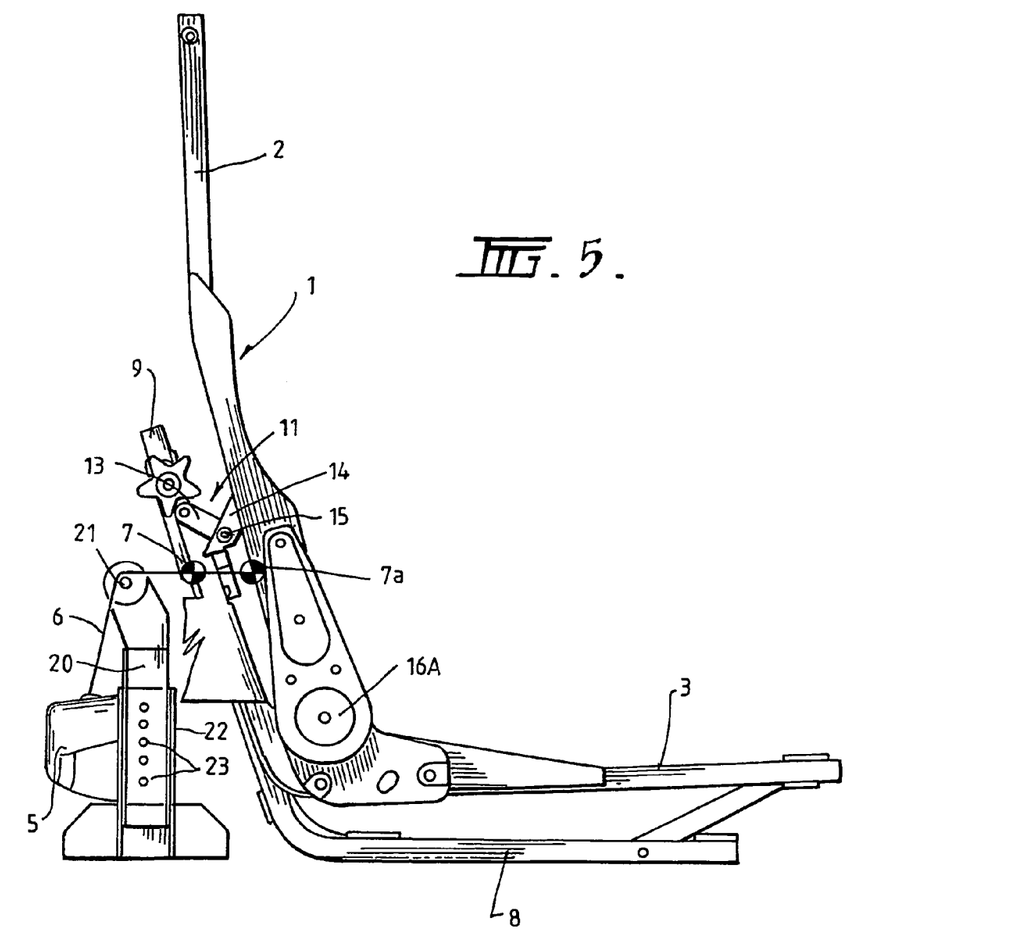
FIG. 5 is a side view of a further embodiment of the present invention.

FIG. 5 shows a further embodiment of a suspension seat in accordance with the present invention. The same reference numerals have been used for similar components to the components of FIGS. 1 to 4, and no further description will be given here of those components. Note that the seat belt retractor mechanism mounting 18 is not shown in FIG. 5, for the purposes of clarity, although in operation it would be present.

In the embodiment of FIG. 5, the tether strap 6 is mounted to enable height adjustment. Height adjustable column 20 mounts at a top end thereof a roller or guide 21 over which the tether 6 is arranged to pass. Column 20 can be moved within sleeve 22 and incorporating holes 23 in the sleeve and column enable the height of the column 22 be adjusted and retained. The height of the roller or guide 21 can therefore be adjusted in order to adjust the height of the tether strap 6 relative to the seat frame 1. Note that the tether strap 6 may be connected to the suspension frame (tether point 7) or directly to the seat back (tether point 7a).

In some seat arrangements with suspension arrangements, the suspension arrangement is not at the back of a seat as indicated in this embodiment, but elsewhere. The linkage 11 may then be mounted to a support member provided at the back of the seat arrangement.

In a further alternative, the tether strap may be connected directly to the seat back 2 (as in FIG. 5), thus avoiding the need for the linkage 11.

Figure 6:
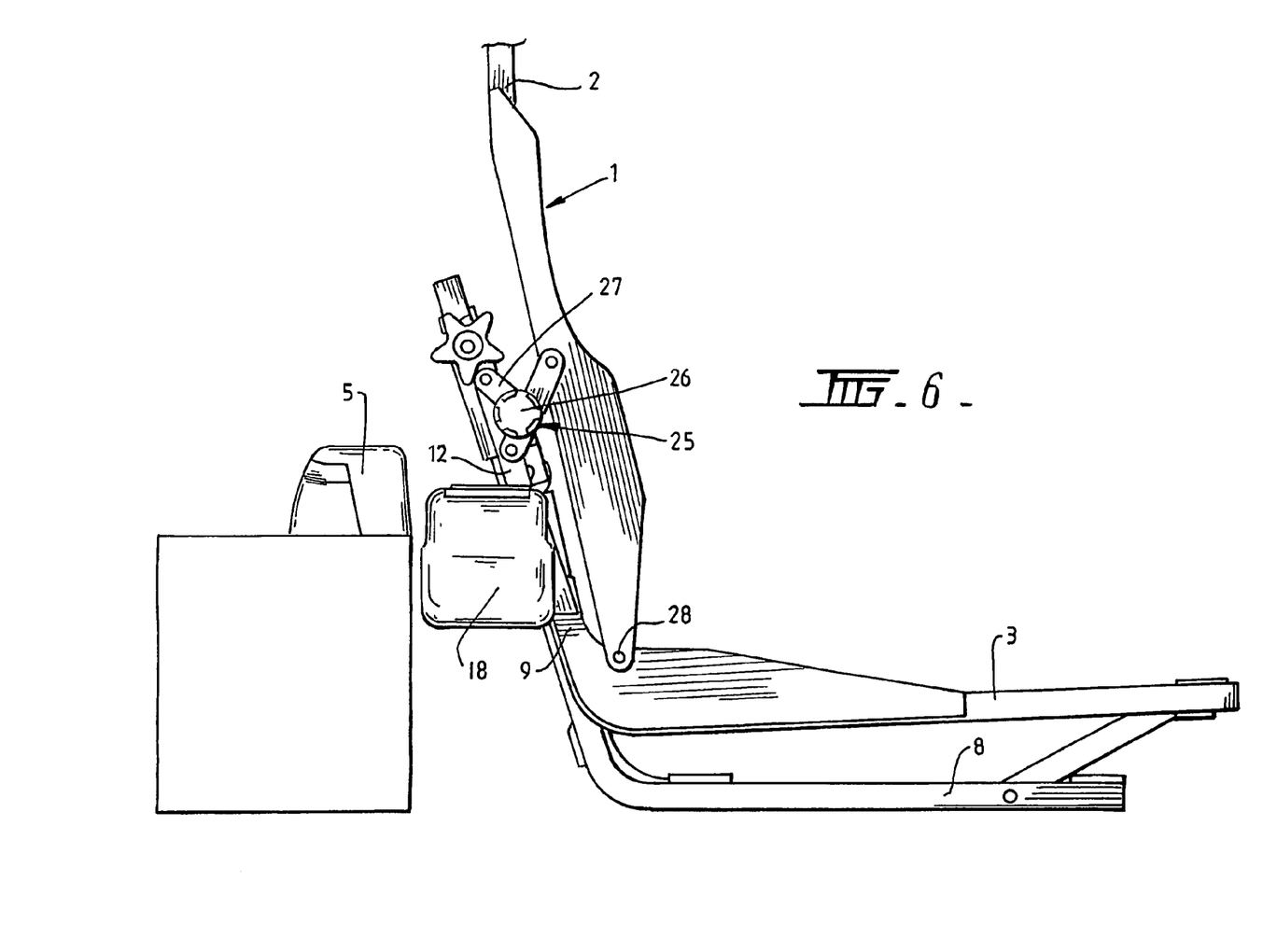
FIG. 6 is a side view of yet a further embodiment of the present invention.

FIG. 6 is a side view of a further embodiment of the present invention. This embodiment is a modification of the embodiment of FIG. 5 and the same reference numerals have been used in FIG. 6 for equivalent components to those of FIG. 5. The modification relates to the linkage between the suspension system 9 and the seat back 2. In this variation, the linkage is replaced by a recliner mechanism 25. The recliner mechanism 25 includes a rotatable handle 26 which can be rotated to adjust the extension of a linkage 27 connecting the suspension arrangement 9 and seat back 2. Rotation of the handle 26 extends or retracts the linkage 27 to effect reclining of the seat back 2. The recliner mechanism 25 may be a standard recliner mechanism, with standard adjustment. The difference here is that the linkage is strong enough to support a load applied to the seat back 2 in the event of an accident.

Figure 1:
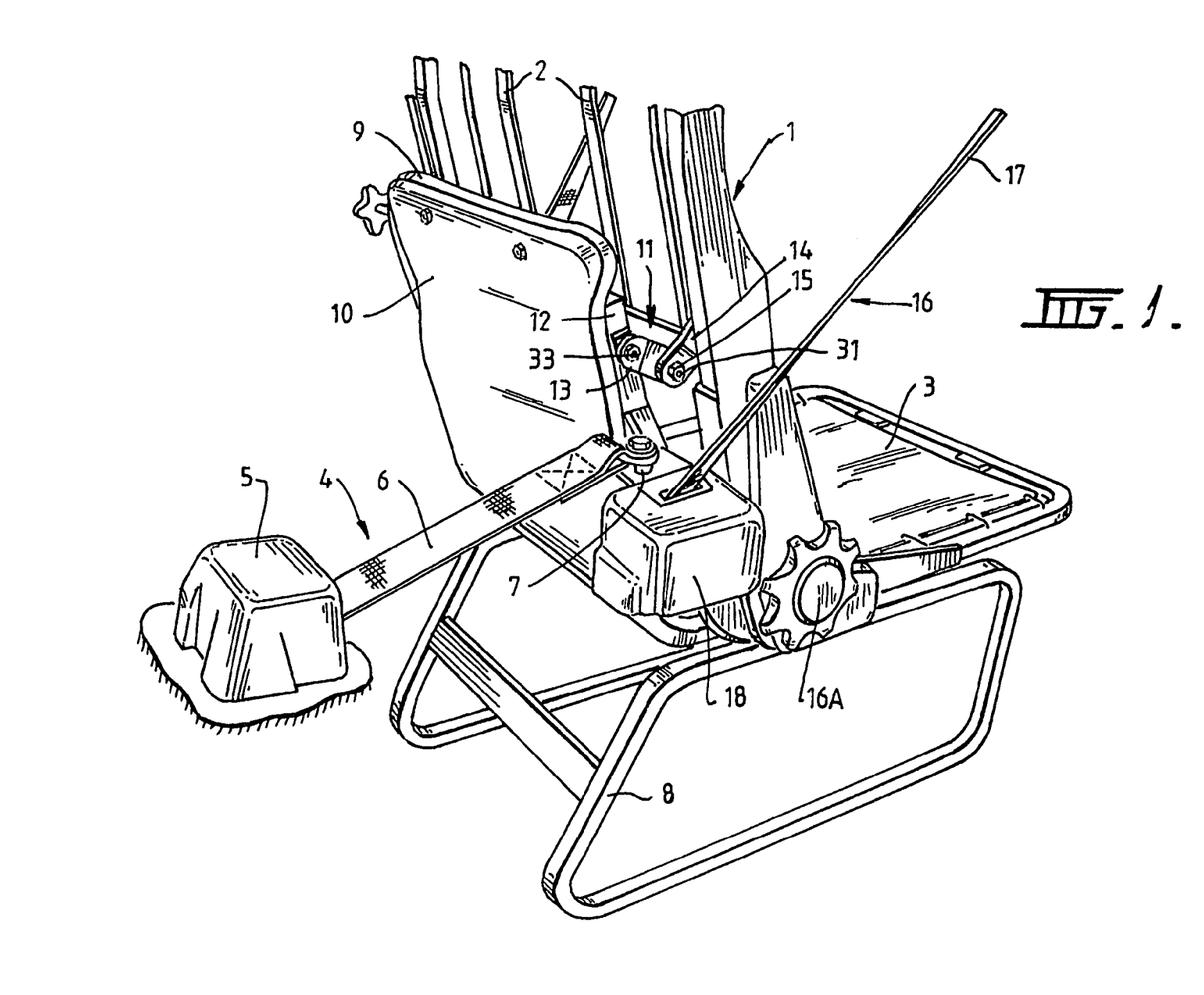
FIG. 1 is a view from the back and one side of a seat arrangement in accordance with an embodiment of the present invention.
Figure 2:
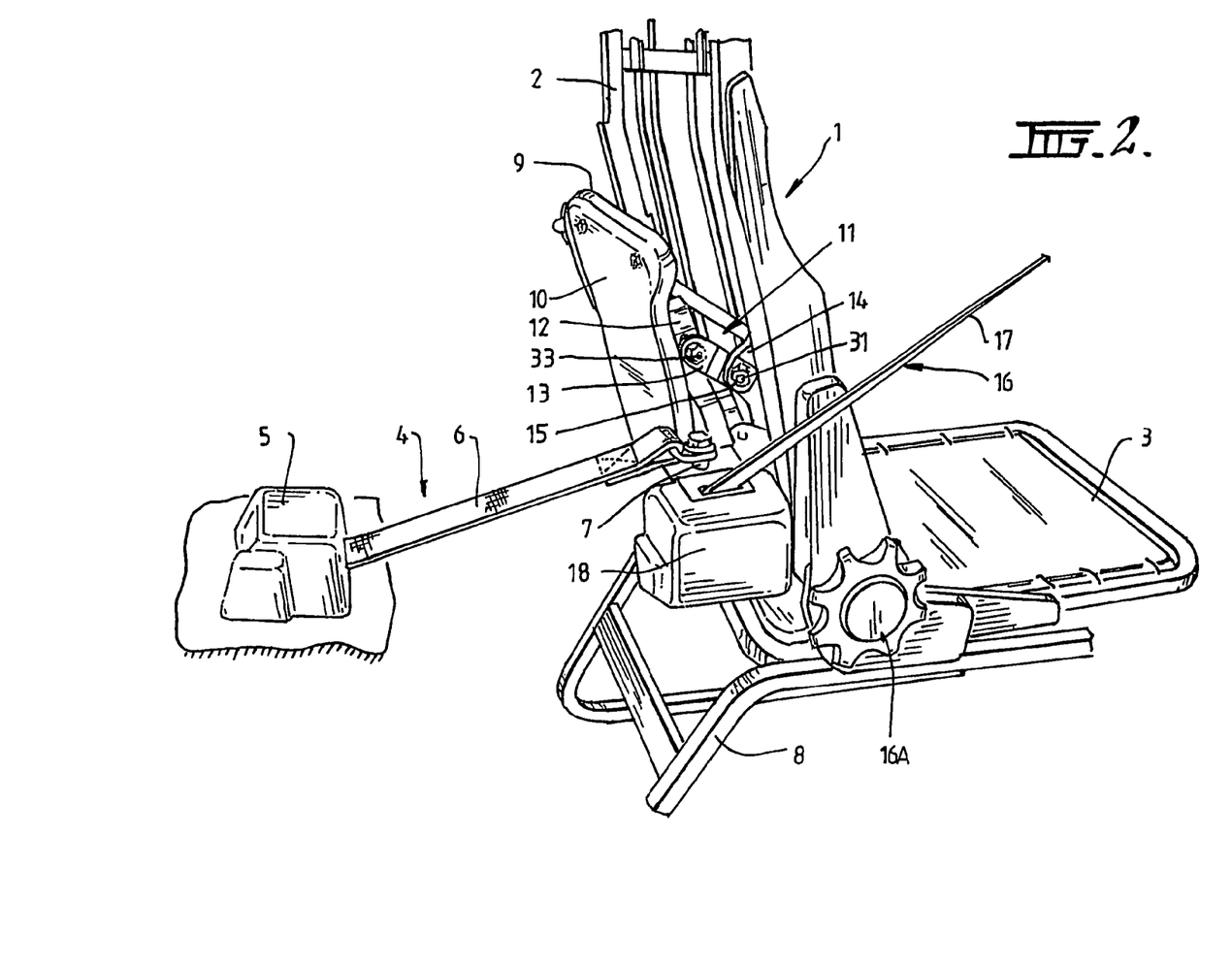
FIG. 2 is a view from the side of the seat arrangement of FIG. 1.

In this embodiment there is no need for the conventional recliner mechanism, usually mounted between the seat back and seat base (as in the FIG. 1 and FIG. 5 embodiments). Instead, this conventional recliner mechanism is replaced by a pivot 28 connecting the seat back 2 and the seat base 3.

The tether mechanism may be fitted with a pre-tension seat belt retractor, similar to that applied in modern vehicles, which operates to draw in the tether strap in collisions.

In the above embodiment, only one tether means is used. More than one tether means can be used to anchor the seat.

In the above embodiment, the seat arrangement includes a suspension mechanism. It need not do. The tether mechanism may be applied with a conventional, non-suspension, seat.

Figure 7:
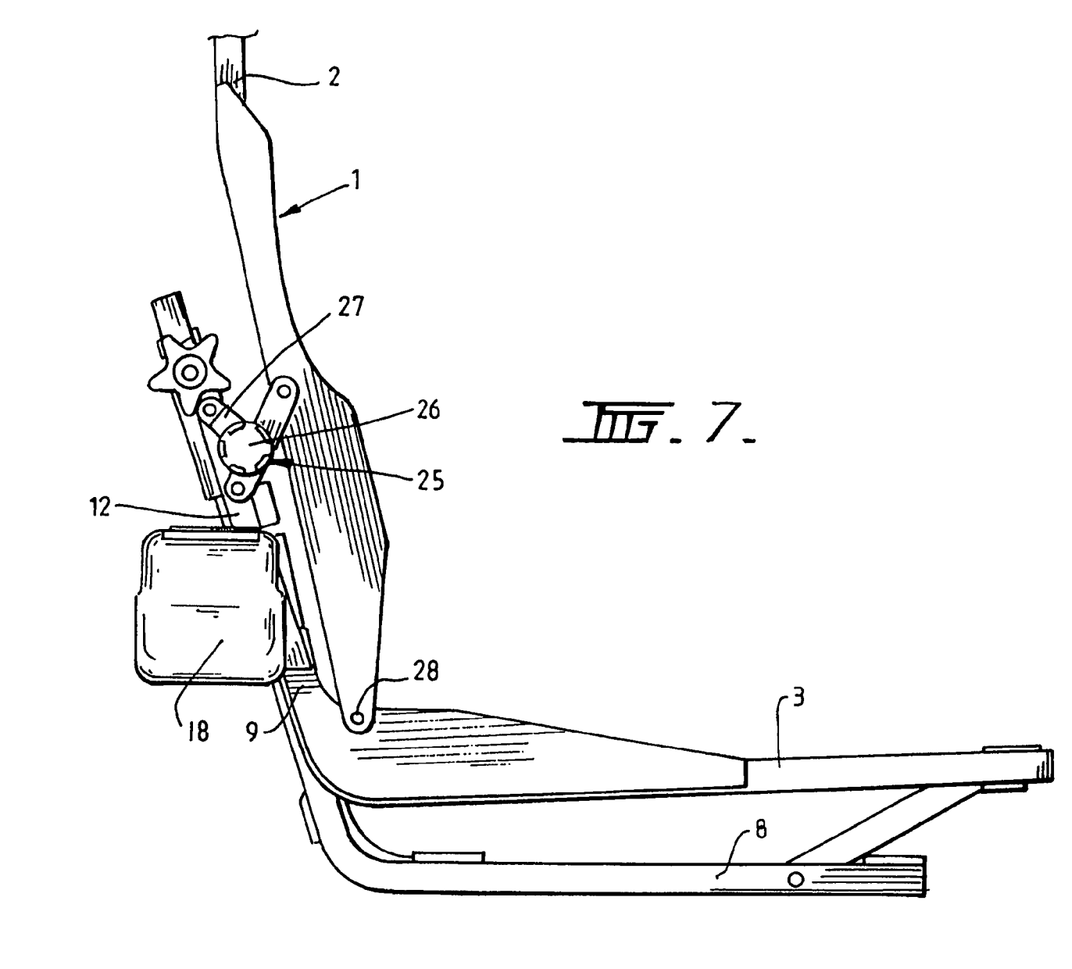
FIG. 7 is a side view of yet a further embodiment of the present invention.

Yet a further embodiment of the present invention is illustrated in FIG. 7. Again, the same reference numerals have been used for equivalent components illustrated in other figures. A further detailed description of these components will not be given here.

Figure 3:
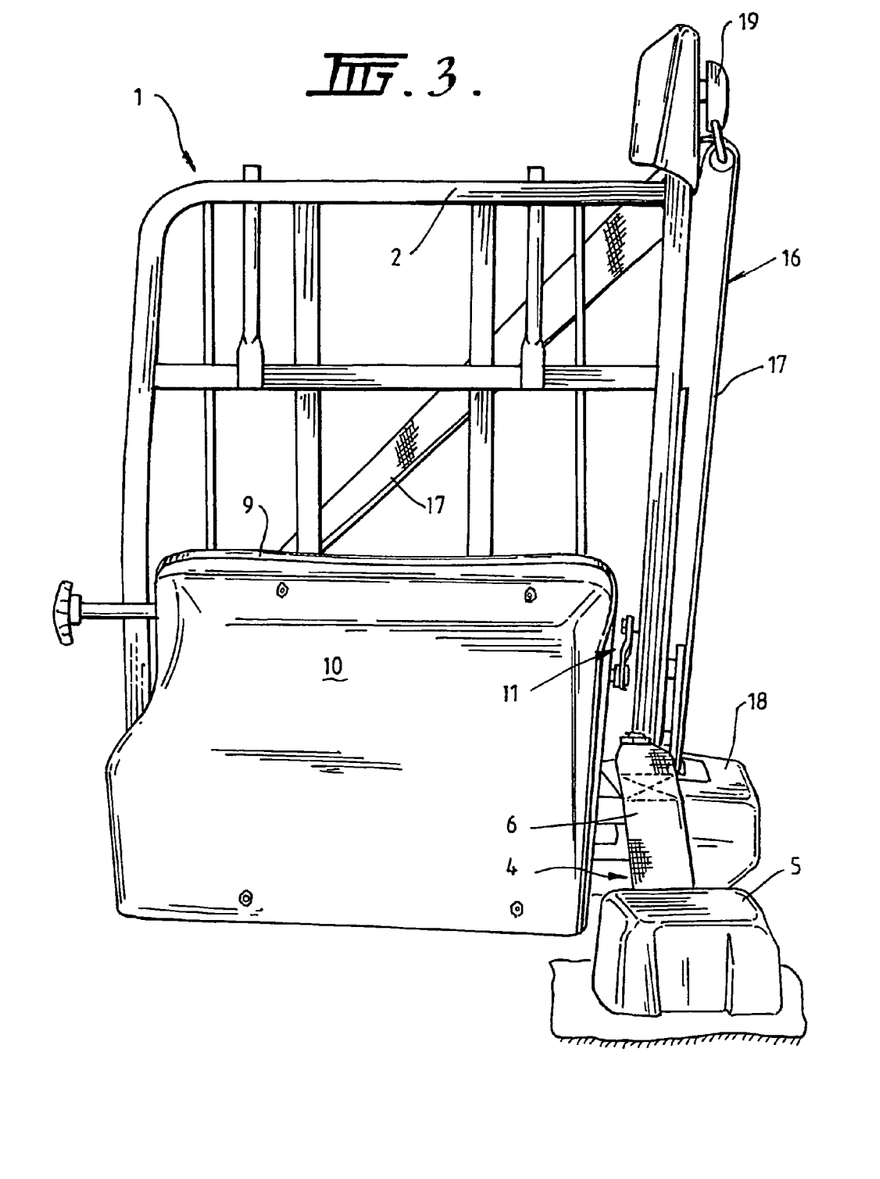
FIG. 3 is a view from the rear of the seat arrangement of FIG. 1.

In this embodiment, a tether strap is dispensed with. The arrangement relies on the link means 26 to resist any load applied to the seat back 1 by, for example, a load on the seat back 2 applied by the integral lap/sash type seat belt (FIG. 3). The support member 12 and rails 8 are made strong enough to resist this load.

Either a link 11, such as illustrated in FIGS. 1-5, or a recliner link 26 as illustrated in FIG. 6 may be utilised.

Figure 8:
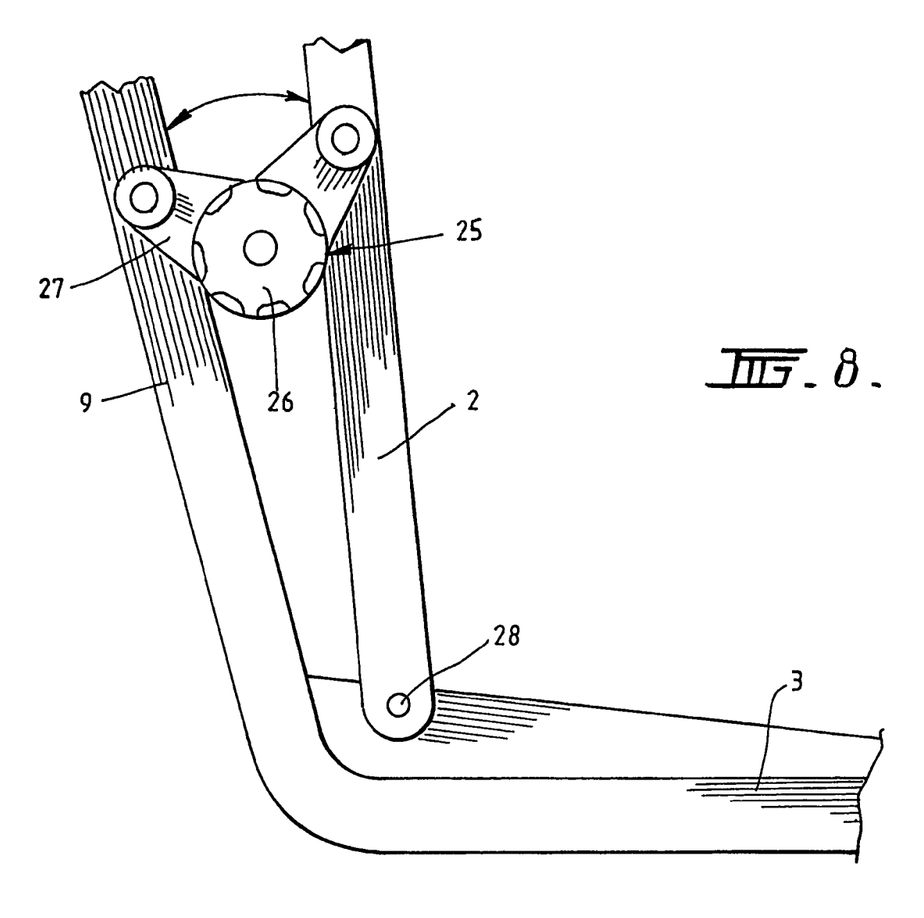
FIG. 8 is a detailed schematic view illustrating a linkage between a seat back and support member.

FIG. 8 is a schematic detail of an appropriate recliner link mechanism 26 which could be utilised in any of the embodiments discussed above as the link means to connect the seat back to the support member 12. The recliner mechanism 25 shown includes a hand wheel 26 which actuates an epicyclic gear train, as is known in standard recliner mechanisms of this type. An alternative would be to use a lever controlled rack arrangement.

The recliner mechanism 25 is placed remotely from the seat back pivot. Leverage applied by a seat belt having a mounting point at the top of the seat back will be less to the linkage 25 than at the pivot point.

Modifications and variations as would be apparent with skilled addressee and deemed to be within the scope of the present invention.

The ivnetion claimed is:

1. A vehicle suspension seat arrangement, comprising a seat frame, including a seat base and a seat back, and a support member arranged to be mounted relative to a vehicle proximate the seat back, the seat frame being suspended on and movable relative to the support member and a link means comprising a first member connected to the support member and a second member connected to the seat back, the first and second members hinged together and being arranged to prevent motion of the seat back beyond a predetermined position corresponding to the extension of the first member and the second member.

2. The vehicle seat arrangement in accordance with claim 1, wherein the link means is a mechanical scissor link.

3. The vehicle seat arrangement in accordance with claim 1, wherein the link means includes a recliner mechanism.

4. The vehicle seat arrangement in accordance with claim 1, wherein the link means is strong enough to resist motion of the seat frame relative to the support member beyond a predetermined position when a load is applied to the seat back such as may be applied by a seat belt mounting of the seat back in a vehicle accident.

5. The vehicle seat arrangement in accordance with claim 1, including an integral seat belt.

6. The vehicle seat arrangement in accordance with claim 1, wherein the link means is positioned remote from a pivot connection between the seat back and the seat base.

* * * * *